United States Patent Office 3,522,302
Patented July 28, 1970

3,522,302
p-(2-AMINOCYCLOALKYL)BENZENE-SULFONAMIDES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed May 16, 1967, Ser. No. 638,770
Int. Cl. C07c *143/70, 143/80*
U.S. Cl. 260—543                                                9 Claims

ABSTRACT OF THE DISCLOSURE p-(2-aminocycloalkyl)benzenesulfonamides with hypotensive activity prepared by acylation of a phenylcycloalkylamine, chlorosulfonation, amination, and then hydrolysis. Cycloalkyl groups with 3 to 6 carbons are disclosed.

---

This invention relates to benzenesulfonamide compounds having hypotensive activity. In particular, the invention relates to benzenesulfonamide compounds having in the p-position thereof an aminocycloalkyl group.

The compounds of the invention are characterized by the following structural formula:

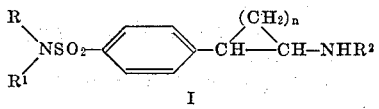

I wherein:
R and $R^1$ are each hydrogen, lower alkyl, or cycloalkyl;
$R^2$ is hydrogen or methyl; and
$n$ is an integer from 1 to 4.

The invention also relates to the pharmaceutically acceptable acid addition salts of the compounds of Formula I, particularly, but not being limited to, the hydrochloride, hydrobromide, sulfate, nitrate, maleate, citrate, tartrate, acetate, and the benzoate.

The term "alkyl" is intended to represent an alkyl group of from 1 to about 5 carbon atoms. The term "cycloalkyl" is intended to represent a cycloalkyl group of from 3 to 6 carbon atoms.

The compounds of the invention are prepared from the known 2-phenylcycloalkylamines according to the reaction sequence illustrated below. Compounds in which $R^2$ is methyl are prepared from the N-methyl-2-phenylcycloalkylamines.

The primary or secondary amino group is protected in the conventional manner by acylation, preferably acetylation, and the resulting amide then treated with chlorosulfonic acid. The resulting amido sulfonyl chloride (IV) is then aminated with ammonia, a primary amine, or a secondary amine, and the resulting sulfonamide V then hydrolyzed to the product with acid or base, preferably with hydrochloric acid.

The amido sulfonamides (V) and the amido sulfonyl chlorides (IV), being useful for the preparation of the active products, are considered part of the present invention.

The starting materials can be cis or trans-2-phenylcycloalkylamines and the products will accordingly possess the same geometric relationships. These phenylcyclopropyl, cyclobutyl, cyclopentyl, and cyclohexylamine starting materials are all disclosed in the literature. The various amine reactants which are condensed with the sulfonyl chlorides are also known compounds. Preferred among these are, in addition to ammonia, methylamine, dimethylamine, ethylamine, diethylamine, methylethylamine, butylamine, cyclohexylamine, and methylcyclopropylamine. It is apparent that the particular R and $R^1$ groups in the product will be determined by choice of this amine reagent.

The acid addition salts of the compounds of Formula I are prepared by combining the free base with an acid according to conventional procedure. The acid and base are generally brought together when in the form of their ethereal or alcoholic solutions. The hydrochloride or other salt may be obtained directly from the hydrolysis of the amido sulfonamide V to the amine product I depending upon the acid used for the hydrolysis. Conversion of the salt obtained to the free base is readily accomplished by dissolving the salt in water, making the solution basic, and recovering the free base. This base can then be converted to other salts.

The compounds of the invention are hypotensive agents, i.e. they lower blood pressure in mammals. They may be formulated for use in the conventional manner, by combining them with standard pharmaceutical excipients to prepare capsules, tablets, and injectables. They may be administered orally or parenterally in doses of 50–500 mg. 1 to 4 times daily.

The preferred compound of the invention, trans-p-(2-aminocyclopropyl)benzenesulfonamide, has been found to possess significant hypotensive activity when administered orally to metacorticoid hypertensive rats at doses of 80 mg./kg. for four days.

The following examples are intended to illustrate the preparation of the compounds of the invention, but are not to be construed as limiting the scope thereof. Various obvious modifications of the compounds and processes

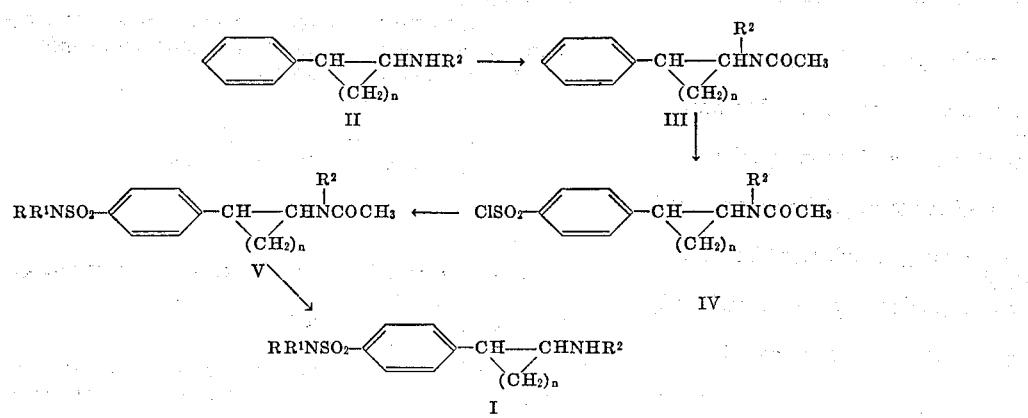

disclosed will occur to those skilled in the art of organic chemistry, and such modifications are considered part of the invention. Temperatures given are in degrees centigrade.

EXAMPLE 1

Trans-p-(2-aminocyclopropyl)benzenesulfonamide

To a stirred suspension of 100 g. of trans-2-phenylcyclopropylamine sulfate in 250 ml. of water is added 120 g. of acetic anhydride. When all the solid has dissolved, a solution of 111 g. of sodium acetate trihydrate in 250 ml. of water is added. The solution is allowed to stand overnight and is extracted with methylene chloride. The extracts are dried and evaporated to give trans-N-acetyl-2-phenylcyclopropylamine, M.P. 90–91° (from benzenehexane).

To 20 g. of this amide in a Dry Ice-acetone bath is added 200 ml. of chlorosulfonic acid. The mixture is kept at room temperature overnight, poured into 2 l. of ice, filtered or decanted, and the residue treated with aqueous ammonia and heated briefly on the steam bath. The mixture is filtered and allowed to cool, and the separated trans-p-(2 - acetamidocyclopropyl)benzenesulfonamide, M.P. 175–176° (from ethanolcyclohexane) obtained.

This sulfonamide (4 g.) is refluxed for 2 hours with 40 ml. of 10% HCl and evaporated. The residual hydrochloride of the title product is recrystallized from ethanol, M.P. 214–215°.

The hydrochloride is dissolved in water, the solution made basic with $Na_2CO_3$, and the resulting free base filtered off or extracted with ether to give the title product.

Use of the cis-2-phenylcyclopropylamine sulfate in place of the trans compound results in obtaining the cis product.

EXAMPLE 2

When the following listed starting materials are acetylated and chlorosulfonated as described in the above procedure, the corresponding listed amido sulfonyl chloride intermediates are obtained. When these intermediates are treated as described above with the listed amines or ammonia, the corresponding listed amido sulfonamides are obtained. Hydrolysis of these compounds gives the listed products, respectively.

Starting material: | Amine
---|---
Trans-2-phenylcyclobutylamine | methylamine.
Cis - N - methyl - 2 - phenylcyclopentylamine | ammonia.
Cis-2-phenylcyclohexylamine | butylamine.
Trans-2-phenylcyclopropylamine | methylethylamine.
Cis-N-methyl - 2 - phenylcyclobutylamine | dicyclohexylamine.
Trans-2-phenylcyclopentylamine | diethylamine.
Cis-2-phenylcyclopropylamine | cyclopropylamine.
Trans-2-phenylcyclopropylamine | methylamine.

Sulfonyl chloride:
- Trans-p-(2-acetamidocyclobutyl)benzenesulfonyl chloride
- Cis-p-(2-N-methylacetamidocyclopentyl)benzenesulfonyl chloride
- Cis-p-(2-acetamidocyclohexyl)benzenesulfonyl chloride
- Trans-p-(2-acetamidocyclopropyl)benzenesulfonyl chloride
- Cis-p-(2-N-methylacetamidocyclobutyl)benzenesulfonyl chloride
- Trans-p-(2-acetamidocyclopentyl)benzenesulfonyl chloride
- Cis-p-(2-acetamidocyclopropyl)benzenesulfonyl chloride
- Trans-p-(2-acetamidocyclopropyl)benzenesulfonyl chloride Amidosulfonamide:
- Trans-p-(2-acetamidocyclobutyl)-N-methylbenzenesulfonamide
- Cis-p-(2-N-methylacetamidocyclopentyl)benzenesulfonamide
- Cis-p-(2-acetamidocyclohexyl)-N-butylbenzenesulfonamide
- Trans-p-(2-acetamidocyclopropyl)-N-methyl-N-ethylbenzenesulfonamide
- Cis-p-(2-N-methylacetamidocyclobutyl)-N,N-dicyclohexylbenzenesulfonamide
- Trans-p-(2-acetamidocyclopentyl)-N,N-diethylbenzenesulfonamide
- Cis-p-(2-acetamidocyclopropyl)-N-cyclopropylbenzenesulfonamide
- Trans-p-(2-acetamidocyclopropyl)-N-methylbenzenesulfonamide Product:
- Trans-p-(2-aminocyclobutyl)-N-methylbenzenesulfonamide
- Cis-p-(2-methylaminocyclopentyl)benzenesulfonamide
- Cis-p-(2-aminocyclohexyl)-N-butylbenzenesulfonamide
- Trans-p-(2-aminocyclopropyl)-N-methyl-N-ethylbenzenesulfonamide
- Cis-p-(2-methylaminocyclobutyl)-N,N-dicyclohexylbenzenesulfonamide
- Trans-p-(2-aminocyclopentyl)-N,N-diethylbenzenesulfonamide
- Cis-p-(2-aminocyclopropyl)-N-cyclopropylbenzenesulfonamide
- Trans-p-(2-aminocyclopropyl)-N-methylbenzenesulfonamide.

We claim:
1. A compound of the formula

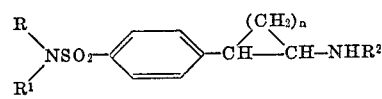

wherein:
R and $R^1$ are each hydrogen, lower alkyl, or cycloalkyl of 3 to 6 carbon atoms;
$R^2$ is hydrogen or methyl; and
$n$ is an integer from 1 to 4,
or a pharmaceutically acceptable acid addition salt therof.

2. A compound as claimed in claim 1 in which $n$ is 1 and R and $R^1$ are hydrogen or methyl.

3. A compound as claimed in claim 2, being the compound trans-p-(2-aminocyclopropyl)benzenesulfonamide.

4. A compound as claimed in claim 2, being the compound trans-p-(2-aminocyclopropyl) - N - methylbenzenesulfonamide.

5. A compound as claimed in claim 2, being the compound cis-p-(2-aminocyclopropyl)benzenesulfonamide.

6. A compound of the formula

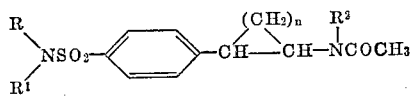

wherein:
R and $R^1$ are each hydrogen, lower alkyl, or cycloalkyl of 3 to 6 carbon atoms;
$R^2$ is hydrogen or methyl; and
$n$ is an integer from 1 to 4.

7. A compound as claimed in claim 6, being the compound trans-p-(2 - acetamidocyclopropyl)benzenesulfonamide.

8. A compound of the formula
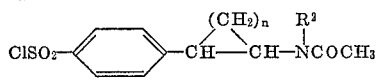
wherein:
$n$ is an integer from 1 to 4 and
$R^2$ is hydrogen or methyl.
9. A compound as claimed in claim 8, being the compound trans-p-(2-acetamidocyclopropyl)benzenesulfonyl chloride.
References Cited
Chemical Abstracts, vol. 54, p. 3719f, Tedeschi et al., 1960.
HENRY R. JILES, Primary Examiner
S. D. WINTERS, Assistant Examiner
U.S. Cl. X.R.
260—556, 562, 999